United States Patent
Sagberg et al.

(10) Patent No.: US 7,286,292 B2
(45) Date of Patent: Oct. 23, 2007

(54) CONFIGURABLE DIFFRACTIVE OPTICAL ELEMENT

(75) Inventors: Håkon Sagberg, Olso (NO); Ib-Rune Johansen, Oslo (NO); Odd Løvhaugen, Oslo (NO); Olav Solgaard, Stanford, CA (US); Matthieu Lacolle, Oslo (NO)

(73) Assignees: Sinvent AS, Trondheim (NO); The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 10/541,317

(22) PCT Filed: Dec. 22, 2003

(86) PCT No.: PCT/NO03/00437

§ 371 (c)(1),
(2), (4) Date: Nov. 29, 2005

(87) PCT Pub. No.: WO2004/059365

PCT Pub. Date: Jul. 15, 2004

(65) Prior Publication Data

US 2006/0103936 A1    May 18, 2006

(30) Foreign Application Priority Data

Dec. 30, 2002   (NO) .................................. 2002 6279

(51) Int. Cl.
*G02B 5/18* (2006.01)
(52) U.S. Cl. ..................... 359/573; 359/572; 359/569
(58) Field of Classification Search ................ 359/573, 359/572, 569
See application file for complete search history.

(56) References Cited

U.S. PATENT DOCUMENTS

| | | | |
|---|---|---|---|
| 4,729,658 A | 3/1988 | Poultney | |
| 6,246,814 B1 | 6/2001 | Park | |
| 6,381,061 B2 | 4/2002 | Levola | |
| 7,042,620 B2* | 5/2006 | Song | ......................... 359/290 |
| 7,046,410 B2* | 5/2006 | Deutsch et al. | ............. 359/224 |
| 2002/0027840 A1 | 3/2002 | Morishita et al. | |
| 2002/0105725 A1 | 8/2002 | Sweatt et al. | |
| 2003/0174958 A1 | 9/2003 | Cizek et al. | |
| 2004/0218172 A1* | 11/2004 | DeVerse et al. | ............ 356/300 |
| 2006/0132766 A1* | 6/2006 | Richman et al. | ............ 356/318 |

FOREIGN PATENT DOCUMENTS

| | | |
|---|---|---|
| CN | 1223380 A | 7/1999 |
| CN | 1339706 A | 3/2002 |
| CN | 1568436 A | 1/2005 |
| CN | 1639609 A | 7/2005 |
| EP | 0 750 207 A2 | 12/1996 |
| EP | 1 172 681 A2 | 1/2002 |
| WO | 2003/016965 A1 | 2/2003 |
| WO | 2003021338 A2 | 3/2003 |

* cited by examiner

*Primary Examiner*—Fayez G. Assaf
(74) *Attorney, Agent, or Firm*—Rothwell, Figg, Ernst & Manbeck, PC

(57) ABSTRACT

This invention relates to a configurable diffractive optical element comprising an array of diffractive sub-elements having a reflective surface, wherein each sub-element has a controllable position with a chosen range, and in which a number of sub-elements are provided with a reflective grating with a number of predetermined spectral characteristics.

15 Claims, 3 Drawing Sheets grating array

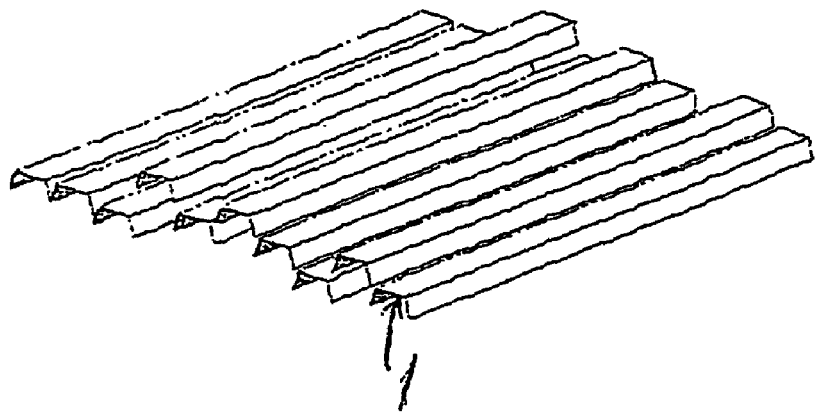
Figure 1: beam array
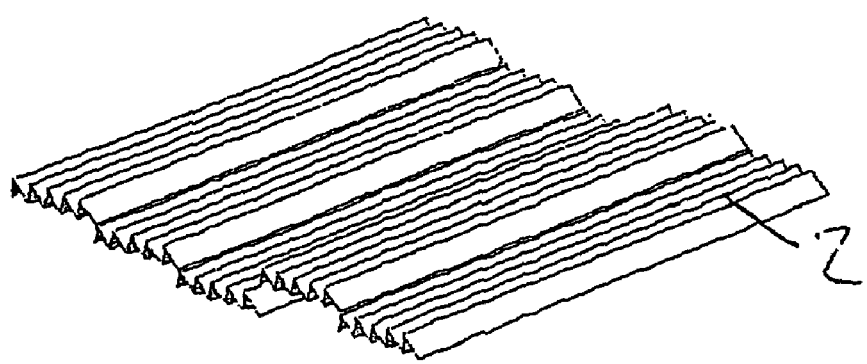
Figure 2: grating array

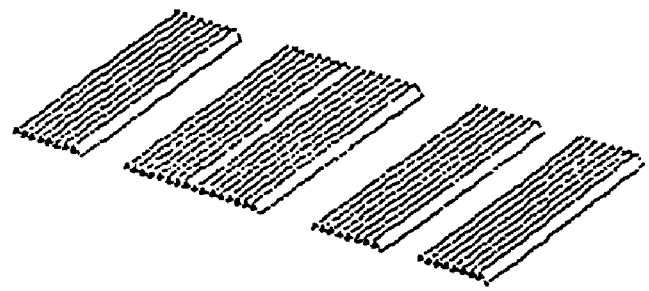
Figure 3: lateral movement array
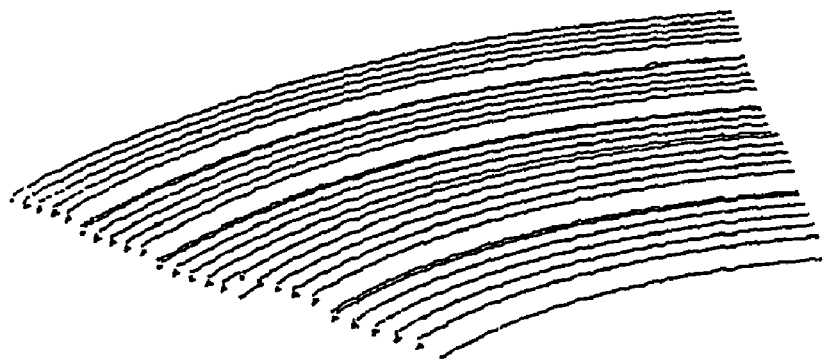
Figure 4: focusing array

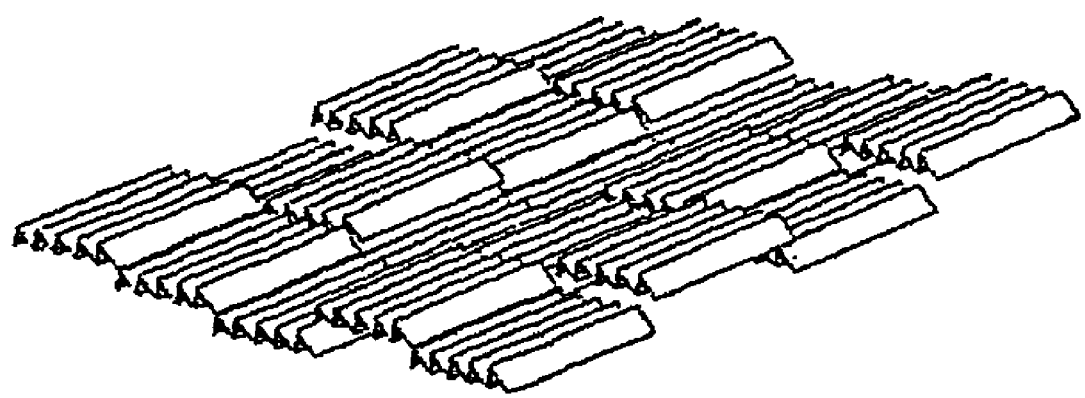
Figure 5: double array

CONFIGURABLE DIFFRACTIVE OPTICAL ELEMENT

CROSS REFERENCE TO RELATED APPLICATION

This application is a 35 U.S.C. § 371 National Phase Entry Application from PCT/NO03/00437, filed Dec. 22, 2003, and designating the U.S.

This invention relates to a configurable diffractive optical element comprising an array of diffractive sub-elements having a reflective surface.

The decomposition of light into its component frequencies (wavelengths) is fundamental to optical spectroscopy. According to this invention a class of optical devices is provided that serve as configurable spectral filters. The devices receive an incident beam composed of light of different frequencies. They direct part of the light in a certain direction or onto a focal point. The devices consist of a system of movable diffractive microstructures on a substrate. By applying different voltages to the device, we alter the relative positions of the microstructures and thus we also alter the spectral composition of the diffracted light.

Spectral filters are important for all kinds of optical measurements. In the following we use the term spectral filter in a broad sense to describe all devices that selectively remove light with specific frequencies, totally or partially, from a lightpath. If the properties of the filter can be changed over time by applying different voltages, temperatures or other means of actuation we call it a tunable or configurable filter. There is no clear distinction between tunable and configurable except that the latter implies that a larger range of possible filter functions can be realized. Configurable optical filters are particularly important for spectroscopy. One example is the tiltable grating of a conventional monochromator. By our definitions this is an example of a tunable (or configurable) optical filter.

A diffractive optical element is a generalized 1- or 2-dimensional optical grating or hologram, made to synthesize a light field by exposing different parts of an incident light beam to different phase delays and/or amplitude modulations. With micro-electromechanical systems (MEMS) it is possible to make configurable DOEs. With current silicon micromachining technology it is not difficult to make moving parts with dimensions less than 10 micrometer. In a configurable DOE (CDOE) the top of such moving parts will be an optical surface: Mirrors, gratings or more complex structures for filtering or focusing. In the following we will call each surface a diffractive sub-element. Their relative positions can be tuned with a resolution much less than typical optical wavelengths, and the interference between reflections from the different parts determines the resulting light field.

A CDOE for synthesizing spectral filters ("The Polychromator") has been designed and implemented by G. B. Hocker et al. "The polychromator: A programmable mems diffraction grating for synthetic spectra." In *Solid-State Sensor and Actuator Workshop*, pages 89–91, Hilton Head Island, S.C., June 2000. This device is an electrostatically controlled array of beams. The beams can move vertically and the top of each beam is reflecting and plays the role as a grating element. The underlying theory of synthetic filters is given by Michael B. Sinclair et al. "Synthetic spectra: a tool for correlation spectroscopy." *Applied Optics*, 36(15), 1997, which in turn is based on the phase retrieval algorithm (PRA) developed by Gerchberg and Saxton around 1970. (See for instance J. R. Fienup. "Phase retrieval algorithms: a comparison." *Applied Optics*, 21(15): 58–69, 1982.) The disadvantage of "The Polychromator" is that light with a wide spectral range is diffracted at one single angle, limiting the resolution that can be obtained. Higher resolution can be obtained with a larger number of beams, but this increases the complexity of the device and makes it impractical to control. It is also a disadvantage that light cannot be focused onto a detector. This is possible with a concave ruled grating or, as we will show, a focusing diffractive pattern. Finally, the many gaps between the moving grating elements may reduce diffraction efficiency.

U.S. Pat. No. 5,905,571, Optical apparatus for forming correlation spectrometers and optical processors, describes an optical apparatus for forming correlation spectrometers and optical processors. The optical apparatus comprises one or more diffractive optical elements formed on a substrate for receiving light from a source and processing the incident light. The optical apparatus includes an addressing element for alternately addressing each diffractive optical element thereof to produce for one unit of time a first correlation with the incident light, and to produce for a different unit of time a second correlation with the incident light that is different from the first correlation. In preferred embodiments of the invention, the optical apparatus is in the form of a correlation spectrometer; and in other embodiments, the apparatus is in the form of an optical processor. In some embodiments, the optical apparatus comprises a plurality of diffractive optical elements on a common substrate for forming first and second gratings that alternately intercept the incident light for different units of time. In other embodiments, the optical apparatus includes an electrically-programmable diffraction grating that may be alternately switched between a plurality of grating states thereof for processing the incident light. The optical apparatus may be formed, at least in part, by a micromachining process.

U.S. Pat. No. 5,757,536, Electrically-programmable diffraction grating describes an electrically-programmable diffraction grating. The programmable grating includes a substrate having a plurality of electrodes formed thereon and a moveable grating element above each of the electrodes. The grating elements are electrostatically programmable to form a diffraction grating for diffracting an incident beam of light as it is reflected from the upper surfaces of the grating elements. The programmable diffraction grating, formed by a micromachining process, has applications for optical information processing (e.g. optical correlators and computers), for multiplexing and demultiplexing a plurality of light beams of different wavelengths (e.g. for optical fiber communications), and for forming spectrometers (e.g. correlation and scanning spectrometers). A device of this type has the disadvantage of having to control a large number of elements to achieve high spectral resolution within a narrow spectral range.

It is the object of this invention to provide a configurable diffractive optical element providing a good resolution within a predetermined frequency range, e.g. for spectral interrogations, with a low number of electrically actuated parts. The invention also provides focusing of the light beam, eliminating the need for additional optical components.

This is obtained using an element according to the accompanying claims.

Several extensions/improvements of the electrically-programmable diffraction grating are possible according to the invention. They will be listed below and explained in more detail later.

A CDOE can be made to focus light. This reduces the need for additional optical components, which may be expensive and require difficult alignment. One way to make a focusing device is to shape the diffractive sub-elements like Fresnel zones or sectors of Fresnel zones.

A low number of wide sub-elements with a blazed grating surface can be used instead of a high number of narrow sub-elements with a plane reflecting surface. See the difference between FIG. 1 and FIG. 2. For a large group of applications this will both reduce the mechanical complexity of the CDOE and increase diffraction efficiency.

The phase modulation can also be obtained by moving the beams sideways, i.e. in a direction parallel to the surface. With silicon on insulator (SOI) technology with comb-drives it is possible to make better optical surfaces with fewer process steps.

The previous examples are all 1-dimensional arrays. Even the Fresnel zone structure can be considered a 1-dimensional array in polar coordinates. In the more general case, the plane of the CDOE can be divided into arbitrary patches, where each patch is a diffractive sub-element with phase modulation by vertical or horizontal movement.

The invention will be described below with reference to the accompanying drawings, illustrating the invention by way of examples.

FIG. 1 illustrates the known art in which the grating is constituted by the relative position between a number of reflective, plane surfaces.

FIG. 2 illustrates the principle of the present invention.

FIG. 3 illustrates a first alternative embodiment of the invention.

FIG. 4 illustrates a second alternative embodiment of the invention.

FIG. 5 illustrates a third embodiment of the invention in which the sub-elements constitutes a two-dimensional array.

The theory of a grating as illustrated in FIG. 1 is described as follows: The Fraunhofer approximation to far-field diffraction from a plane screen is simply to take the Fourier transform of the optical field at the screen. For one spatial dimension this can be written as $$U(k \sin \theta) = F[u(x)] \quad (1)$$

where $k=2\pi/\lambda$, $\theta$ is the diffraction angle and x the screen position. If we were to design a DOE for collimated light with incident angle zero, U would be our target function and $u(x)$ the complex transmission/reflection coefficient of the DOE aperture. U is a function of the product between k and $\sin \theta$ — wavelength and angle play the same roles. A DOE can be used to synthesize a spatial(angular) pattern for a fixed wavelength, or a spectral pattern for a fixed angle, or a combination of both. Unless otherwise said we will in the following consider spectral patterns at a fixed angle and we write $k_x = k \sin \theta$.

To determine the shape of the diffracting surface that produces the target function U in the far-field we make the inverse Fourier transform of Eq. 1:

$$u(x) = F^{-1}[U(k \sin \theta)] \quad (2)$$

This results in a complex function $u(x)$ where both phase angle and amplitude varies. However it is common that we have some restrictions on $u(x)$, for instance that $|u(x)|=1$. That means we are limited to, or have chosen to, only control the phase of $u(x)$. In that case we have to resort to a numerical algorithm to find $u(x)$. An example of such an algorithm is the PRA, which appears in different variations with different names. Here, the $u(x)$ are found by iterative Fourier transforms, applying restrictions or constraints in the spatial and spectral domains.

Referring to FIG. 1, which illustrates the known art, an array of beams like the "Polychromator" described above is a suitable device to demonstrate basic properties of configurable DOEs and the iterative Fourier transform. Neglecting the space between elements, the complex reflection coefficient of the beam array can be written as $$u(x) = \exp[i\phi(x)] = \left[\sum_{n=1}^{N} u_n \delta(x - nd)\right] * p(x) \quad (3)$$

$p(x)$ is the reflection coefficient of a single beam, $u_n = \exp(i\phi_n)$, and * represents convolution. For beams with flat mirror surfaces, $p(x) = \text{rect}(x/d)$. The relationship between DOE height h and phase delay $\phi$ is $\phi = 2\pi h(\cos \alpha + \cos \beta)/\lambda$ for light with incident angle $\alpha$ and diffracted angle $\beta$.

The Fourier transform of Eq. 3 is $$U(k_x) = F\left[\sum_{n=1}^{N} u_n \delta(x - nd)\right] F[p(x)] \quad (4)$$

$$= \left[\sum_{n=1}^{N} u_n \exp(-ik_x nd)\right] P(k_x)$$

The sum in the square brackets is just the truncated Fourier series with coefficients $u_n$. The series is periodic in $k_x$ with period $\Delta k_x = 2\pi/d$. This term is multiplied with the Fourier transform of $p(x)$. In the case that $p(x) = \text{rect}(x/d)$, $P(k_x) = \sin c(k_x d/2\pi)$ Given a target function U, the coefficients $u_n$ can be determined with e.g. the PRA algorithm described above. As for a regular grating, the highest optical frequency that can be resolved is proportional to Nd, the product of the number of grating elements and the grating period, while the cutoff frequency or free spectral range is given by the first zero of the sin c envelope function:

$$P(k_x) = \sin c(k_x d) = 0 \Leftrightarrow k_{x0} = 2\pi/d \quad (5)$$

Many spectroscopy applications require relatively high resolution in a relatively narrow frequency range $\Delta k_x$ centered on frequency $k_c$.

From Eq. 5 we see that to ensure that $k_c$ is below $k_{x0}$, the period d has to be sufficiently low—A low d is needed to achieve a wide enough spectral range. But since the resolution is proportional to Nd, a large N is needed to maintain a high resolution. This results in a complex device where hundreds or thousands of beams have to be individually controlled. In M A Butler et al. "A mems-based programmable diffraction grating for optical holography in the spectral domain." in *IEDM*, 2001, a way is found of improving the design of "The Polychromator" where they use an additional grating in the light path. We find it much more convenient to change the surface of the beams themselves. The solution, an array of gratings, is described below.

FIG. 2 illustrates a grating array according to the invention wherein the flat top of the beams according to the known art described above is replaced with a short grating with a grating period $d_S < d$. For a sinusoidal grating we have $p(x) = \text{rect}(x/d) \exp(i2\pi x/d_S)$. We then get $P(k_x) = \sin c(k_x d/$ $2\pi \cdot d/d_S$). This is essentially a shifting of the sin c envelope of Eq 5 to the frequency of our choice. The frequency shift is determined by the ratio between the two grating periods. Thus we can achieve high resolution spectral filtering with a low number of beams/elements.

FIG. 3 illustrates a similar solution is which the diffractive sub-elements are moved laterally.

If an element is moved laterally a distance D, the relation between $\phi$ and D is $\phi = 2\pi D(\sin \alpha - \sin \beta)/\lambda$, neglecting the contribution from the area surrounding the subelement.

Many MEMS devices are based on SOI structures with lateral movement actuated by electrostatic comb drives. These structures are stiffer and also easier to fabricate than the multilayer polysilicon process often used to make beam structures with vertical movement.

FIG. 4 illustrates a focusing device according to the invention. Extending to sub-elements with arbitrary shapes, it is possible to make focusing configurable spectral filters. If we shape the sub-elements as Fresnel Zones corresponding to a given focal length, it can be shown that the intensity in the focus is the same as for a one-dimensional beam array or array of gratings.

It is also be possible to use an array of equally sized rectangular sub-elements with focusing diffractive patterns. Spectral synthesis with such structures will be different, as the contribution to the diffraction integral from a single element no longer corresponds to a single term in the Fourier series as in Eq. 4.

FIG. 5 illustrates a double array according to the invention providing a two-dimensional matrix of mirror elements, each comprising a diffractive grating at the surface.

Making an inverse Fourier transform of the target function as in Eq. 2 gives us a complex function u(x) with phase and amplitude information. We can implement a CDOE with both amplitude and phase control with a double array of gratings, or an array of sub-element pairs. If the two sub-elements have equal vertical position, there is constructive interference with maximum amplitude. If the heights of the sub-elements differ by value corresponding to $\pi$ phaseshift, there is destructive interference and we have zero amplitude. The light is diffracted out of the path.

As is described with reference to FIGS. 2–5 the present invention provides a solution with larger sub-elements 2 in which each sub-element is provided with a grating. The grating on each sub-element may be provided with any suitable grating period without other limitations than the ones present in the production of ordinary gratings.

The dimensions of the diffractive sub-elements according to the invention should correspond to a number of periods for the gratings on each sub-elements, e.g. in the order of 100 µm.

Thus it is possible to provide an adjustable diffractive grating with a higher resolution than the similar gratings according to the known art, thus being more suitable e.g. for spectroscopic studies, spectral filtering etc.

The beams or sub-elements according to FIGS. 2, 4 and 5 may be moved in a directions perpendicular to the element surface. In FIG. 3, however, as described above, the positions of the sub-elements may be shifted in the lateral direction parallel to the surface. Any combinations of these movements are of course possible, although more complicated to obtain in practice. Typically the movement relative to direction of the incoming or reflected light should be in the order of ½ the wavelength of the light.

The invention claimed is:

1. Configurable diffractive optical element comprising an array of diffractive sub-elements having a reflective surface, wherein each sub-element has a controllable position with predetermined range, and in which a number of sub-elements are provided with a grating with a number of predetermined spectral characteristics wherein the position of each sub-element is adjustable in a direction parallel to the element surface.

2. Diffractive optical element according to claim 1 wherein the physical size of a sub-element being provided with a grating is substantially larger than the typical spatial period of the grating on said sub-element.

3. Diffractive optical element according to claim 1 wherein the position of each sub-element is adjustable in a direction perpendicular to the element surface.

4. Diffractive optical element according to claim 1 wherein the position of each sub-element is adjustable in a direction parallel to the optical axis of the incoming or reflected light beam.

5. Diffractive optical element according to claim 1 wherein each of the gratings on the sub-elements being provided with a grating is a diffractive grating, which constitutes a diffractive lens.

6. Configurable diffractive optical element comprising an array of diffractive sub-elements having a reflective surface, wherein each sub-element has a controllable position with a chosen range, and in which a number of sub-elements are provided with a grating with a number of chosen special characteristics wherein the array of sub-elements is a two-dimensional array.

7. Diffractive optical element according to claim 6 wherein the physical size of the sub-element being provided with a grating is substantially larger than the typical spatial period of the grating on said sub-element.

8. Diffractive optical element according to claim 6 wherein the position of each sub-element is adjustable in a direction perpendicular to the element surface.

9. Diffractive optical element according to claim 6 wherein the position of each sub-element is adjustable in a direction parallel to the elemen surface.

10. Diffractive optical element according to claim 6 wherein the position of each sub-element is adjustable in a direction parallel to the optical axis of the incoming or reflected light beam.

11. Configurable diffractive optical element comprising a two-dimensional array of diffractive sub-elements having a reflective surface, wherein each sub-element has a controllable position with a chosen range, and in which a number of sub-elements are provided with a grating with a number of chosen spectral characteristics wherein each of the gratings on the sub-elements being provided with a grating is a diffractive grating, which constitutes a diffractive lens.

12. Diffractive optical element according to claim 7 wherein the gratings on the sub-elements being provided with a grating is a diffractive grating, which constitutes a diffractive lens.

13. Diffractive optical element according to claim 11 wherein the position of each sub-element is adjustable in a direction perpendicular to the element surface.

14. Diffractive optical element according to claim 11 wherein the position of each sub-element is adjustable in a direction parallel to the element surface.

15. Diffractive optical element according to claim 11 wherein the position of each sub-element is adjustable in a direction parallel to the optical axis of the incoming or reflected light beam.

* * * * *

UNITED STATES PATENT AND TRADEMARK OFFICE
CERTIFICATE OF CORRECTION

PATENT NO. : 7,286,292 B2
APPLICATION NO. : 10/541317
DATED : October 23, 2007
INVENTOR(S) : Sagberg et al.

It is certified that error appears in the above-identified patent and that said Letters Patent is hereby corrected as shown below:

Claim 5:
Col. 6, line 19, delete "on the sub-elements being"
Col. 6, line 20, delete "provided with a grating"

Claim 11:
Col. 6, line 49, delete "on the sub-elements being provided with a grating"

Signed and Sealed this

Fifteenth Day of July, 2008

JON W. DUDAS
*Director of the United States Patent and Trademark Office*